US010552856B2

(12) United States Patent
Turfboer et al.

(10) Patent No.: US 10,552,856 B2
(45) Date of Patent: Feb. 4, 2020

(54) SOLAR CUSTOMER ACQUISITION AND SOLAR LEAD QUALIFICATION

(71) Applicant: Opower, Inc., Arlington, VA (US)

(72) Inventors: Jonathan Turfboer, Austin, TX (US); Steven Blumenfeld, Washington, DC (US); Anna Lising, Washington, DC (US); Alex Kinnier, Bethesda, MD (US); Daniel Yates, Washington, DC (US); Alexander Laskey, Washington, DC (US)

(73) Assignee: OPower, Inc., Arlington, VA (US)

( * ) Notice: Subject to any disclaimer, the term of this patent is extended or adjusted under 35 U.S.C. 154(b) by 0 days.

(21) Appl. No.: 15/678,777

(22) Filed: Aug. 16, 2017

(65) Prior Publication Data
US 2017/0357989 A1    Dec. 14, 2017

Related U.S. Application Data

(63) Continuation-in-part of application No. 14/458,173, filed on Aug. 12, 2014, now abandoned.

(60) Provisional application No. 61/984,588, filed on Apr. 25, 2014.

(51) Int. Cl.
G06Q 30/02  (2012.01)
G06Q 10/06  (2012.01)
G06Q 50/06  (2012.01)

(52) U.S. Cl.
CPC ..... *G06Q 30/0204* (2013.01); *G06Q 10/0639* (2013.01); *G06Q 30/0201* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 7,047,206 B1 * | 5/2006 | Schultze | .......... | G06Q 10/06311 705/7.13 |
| 7,467,348 B1 * | 12/2008 | Taylor | ............... | G06F 17/30864 705/14.39 |
| 8,311,863 B1 * | 11/2012 | Kemp | ................ | G06Q 10/0639 705/7.11 |
| 2006/0265259 A1 * | 11/2006 | Diana | .................... | G06Q 30/08 705/35 |

(Continued)

FOREIGN PATENT DOCUMENTS

JP    2008077369 A    4/2008
JP    2012073866 A    4/2012

OTHER PUBLICATIONS

European Search Report dated Nov. 28, 2017 for co-pending EP Patent Application No. 15832487.1 filed Apr. 27, 2015.
(Continued)

*Primary Examiner* — Thomas L Mansfield
(74) *Attorney, Agent, or Firm* — Kraguljac Law Group, LLC

(57) ABSTRACT

According to various aspects of the subject technology, systems and methods for qualifying solar leads are described. In certain implementations, data about utility customers and/or other information are used to identify high-quality solar leads, thus reducing the amount of extraneous work for installers and resulting in an overall reduction of the total cost of solar implementations.

19 Claims, 3 Drawing Sheets

(56) References Cited

U.S. PATENT DOCUMENTS

| | | | | |
|---|---|---|---|---|
| 2009/0171722 A1* | 7/2009 | Roberts | ............ | G06Q 10/06393 |
| | | | | 705/7.39 |
| 2010/0332373 A1 | 12/2010 | Crabtree et al. | | |
| 2011/0047048 A1* | 2/2011 | Yahiro | .................. | G06Q 10/10 |
| | | | | 705/26.41 |
| 2011/0137763 A1* | 6/2011 | Aguilar | ................ | G06Q 30/018 |
| | | | | 705/30 |
| 2012/0041895 A1* | 2/2012 | Somech | ................. | G06Q 40/02 |
| | | | | 705/36 R |
| 2012/0150761 A1* | 6/2012 | Ananian | ............ | G06Q 10/1053 |
| | | | | 705/321 |
| 2012/0330719 A1* | 12/2012 | Malaviya | ............... | G06Q 30/02 |
| | | | | 705/7.31 |
| 2012/0330759 A1* | 12/2012 | Aggarwal | .......... | G06Q 30/0271 |
| | | | | 705/14.73 |
| 2013/0297087 A1 | 11/2013 | Koster et al. | | |
| 2013/0307702 A1 | 11/2013 | Pal et al. | | |
| 2014/0337107 A1* | 11/2014 | Foster | ............. | G06Q 10/06395 |
| | | | | 705/7.41 |
| 2015/0066442 A1* | 3/2015 | Pryor | ................. | G06F 17/5009 |
| | | | | 703/1 |

OTHER PUBLICATIONS

Chinese Office Action in co-pending CN Application No. 201580042933.X filing date of Feb. 10, 2017; notification dated Apr. 16, 2018.
INDIA Office Action in co-pending IN Application No. 201747003030; filing date of Jan. 27, 2017; notification dated Apr. 24, 2019 (6 pgs).
JP Office Action dated Mar. 5, 2019 for co-pending JP Patent Application No. 2017507868 filed Feb. 10, 2017.

\* cited by examiner

SOLAR CUSTOMER ACQUISITION AND SOLAR LEAD QUALIFICATION

CROSS REFERENCE TO RELATED APPLICATIONS

This application claims priority to U.S. Non-Provisional application Ser. No. 14/458,173, entitled "SOLAR CUSTOMER ACQUISITION AND SOLAR LEAD QUALIFICATION," filed on Aug. 12, 2014, and U.S. provisional application No. 61/984,588, entitled "RESIDENTIAL SOLAR CUSTOMER ACQUISITION AND SOLAR LEAD QUALIFICATION," filed on Apr. 25, 2014, which are expressly incorporated by reference herein in their entirety.

BACKGROUND

1. Technical Field

The present technology pertains to methods and systems for qualifying solar leads, and in particular, to qualifying solar leads to identify high-quality solar leads.

2. Introduction

In the residential solar market, customer acquisition costs can account for as much as 20% of the total cost of a solar installation. This is due to the fact that many consumers express a high-level interest in solar installation, but close to 95% may never follow-up. There are several high drop-off points in the acquisition funnel that result in significant wasted effort by lead generators and installers. The end result of this is an overall higher cost for all customers, leading to a perpetuation of the problem due to the high barrier to entry. It also creates an unpredictable sales and installation pipeline for installers.

SUMMARY

According to various aspects of the subject technology, systems and methods for qualifying solar leads are described. In certain implementations, data about utility customers and/or other information are used to identify high-quality solar leads, thus reducing the amount of extraneous work for installers and resulting in an overall reduction of the total cost of solar implementations.

BRIEF DESCRIPTION OF THE DRAWING

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
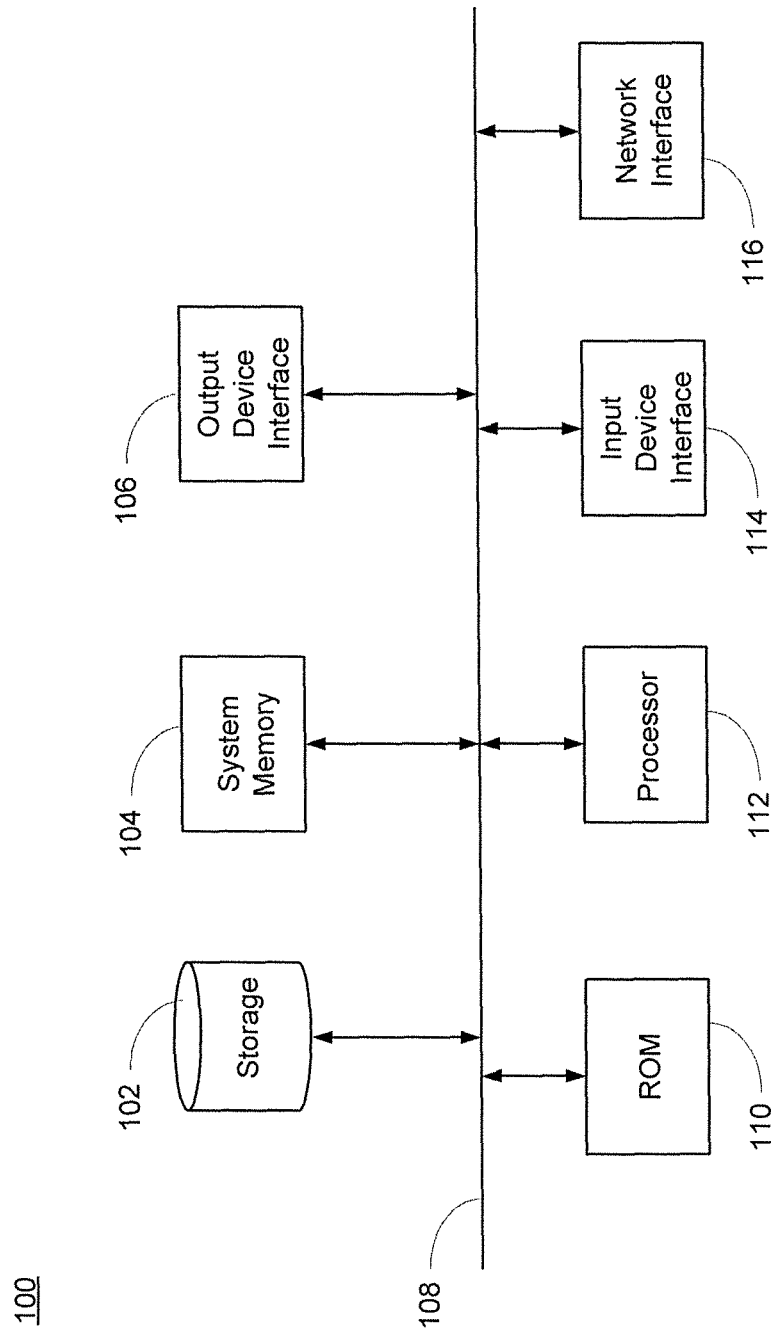
FIG. 1 illustrates an electronic system with which features of the subject technology may be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details.

A large amount of data about utility customers and/or other data may be utilized to identify one or more locations (e.g., homes/buildings that use electricity) that may be high-quality solar leads, thus reducing the customer acquisition costs for solar installations. In some implementations, a computer-implemented system is disclosed that performs an algorithm that includes determining a solar lead by generating several scores for a location (e.g., a home or building) and consolidating the scores into an overall lead score. Data from multiple locations may be analyzed to determine scores for each of the locations. The scores may include a grid score, a behavioral score, an engagement score, and/or a household value score. Each of these scores is described further below according to certain implementations. In one embodiment, the system generates a candidate data structure that identifies the locations that are candidates for solar installations based on the scores, which may be sorted by and/or stored in association with the scores. Thereafter, the system may analyze the candidate data structure and select one or more locations from the data structure and generate an electronic message for each selected location. For example, the system may select one or more locations that are above a threshold rank, or associated with scores greater than a threshold score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the scores in the candidate data structure.

Grid Score

The grid score allows the use of utility-provided grid utilization information and directional guidance to determine the optimal portions of the grid to target for solar implementations. Factors that this score may take into consideration include grid stability, data rate, current solar installation base, and/or weather data.

In one embodiment, utility-provided grid utilization information may be examined to identify a portion of a utility grid that needs additional capacity (e.g., a portion of the grid that is strained). The grid may comprise an electrical grid that delivers electricity generated by one or more power sources (e.g., power plant) to users (e.g., utility customers) distributed over a geographical area. In this example, a user with a solar panel installation may be able to connect the solar panels to the grid to supply excess electrical power from the solar panels (electrical power that the user does not consume) to the grid for use by other users on the grid. Thus, additional capacity may be provided to a portion of the grid that is strained by installing solar panels at user sites (e.g., residential homes) located within and/or near that portion of the grid. This may be a more cost-effective solution for a utility to reduce strain on the grid compared with building an additional power plant. Further, by consuming power generated by the solar panels instead of power from the grid, the user further reduces strain on the grid.

Thus, a user located within or near a portion of a grid that is strained may be given more points towards his/her grid score than a user that is not located within or near a portion of a grid that is strained. This is because, for a utility and/or regulator, a user located within or near a portion of a grid that is strained may be a more attractive target for solar panel installation to reduce strain on the grid.

In this embodiment, a determination of which users are located within or near a portion of the grid that is strained may be made by collecting address information (e.g., home addresses, geographic location coordinates) for the users (e.g., from a public database or from a user device), and comparing the locations of the users' addresses with a geographical area of the portion of the grid that is strained. Alternatively, information identifying which users are located within or near a portion of the grid that is strained may be provided by the utility (e.g., from a utility database).

In one embodiment, a utility and/or regulator may provide incentives (e.g., financial incentives) for a user located within or near a portion of a grid that is strained to install solar panels. For example, such a user may receive a tax credit and/or subsidy for installing solar panels. In this example, these incentives may increase the likelihood that the user would be interested in solar panel installation, and therefore the user may be given more points towards his/her grid score for at least this reason compared with a user that is not located within or near a portion of a grid that is strained.

In one embodiment, the utility may implement time-of-use rates, in which electricity rates vary depending on the time of day. For example, electricity rates may be higher during peak hours (e.g., daylight hours) when demand is higher compared with electricity rates during non-peak hours (e.g., nighttime hours). The utility may do this in an effort to reduce energy consumption during peak hours when strain on the grid may be greatest. As a result, a user that consumes more energy during peak hours (e.g., heavy daytime user) may reduce his/her utility bill by a greater amount by installing solar panels compared with a user that consumes less energy during peak hours. Thus, a user that consumes more energy during peak hours may have a greater financial incentive to install solar panels. Accordingly, in this embodiment, a user that consumes more energy during peak hours may be given more points than a user that consumes less energy during peak hours.

In this embodiment, usage information for a user across a day may be obtained from a smart meter (e.g., at the user's residence). The smart meter may monitor the energy consumption of the user, and report the energy consumption of the user in relatively small time intervals (e.g., of an hour or less) to a utility database (e.g., via a network connection). This information can be used to determine how much energy the user consumes during different times of the day, and therefore whether the user consumes a large amount of energy during peak hours. For example, the usage information may be used to determine an amount of energy (e.g., kWh) the user consumes during peak hours (e.g., 10 a.m. to 6 p.m. or other time period). The amount of energy may then be compared to a threshold. If the amount of energy consumption during peak hours is above the threshold, then the user may be given more points than a user whose energy consumption during peak hours is below the threshold. In another example, a percentage of the user's energy consumption that occurs during peak hours may be computed. If the percentage of the user's energy consumption during peak hours is above a threshold, then the user may be given more points than a user whose percentage of energy consumption during peak hours is below the threshold.

In another embodiment, a user may be scored based in part on a number or percentage other users (neighbors) who have already installed solar panels in a geographical area (e.g., zip code, city, district, community, etc.) of the user. In this embodiment, a user living in a geographical area in which a larger number or higher percentage of other users have already installed solar panels may be given more points than a user living in a geographical area in which a smaller number or lower percentage of other users have already installed solar panels. This is because the user may be more likely to install solar panels if his/her neighbor(s) have already installed solar panels due to word-of-mouth and/or peer pressure.

The grid score for a user may be computed based on the points the user is given for one or more of the factors discussed above. For example, the grid score may be based on an aggregate of the points given to the user for one or more of the factors.

In one embodiment, the system generates a candidate data structure that identifies buildings and/or locations that are candidates for solar installations based on the grid score of each building and/or location. The buildings and/or locations may be sorted by and/or stored in association with the grid scores. Thereafter, the system may analyze the candidate data structure and select one or more locations from the data structure and generate an electronic message for each selected location. For example, the system may select one or more locations that are above a threshold rank, or associated with grid scores greater than a threshold grid score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the grid scores in the candidate data structure.

Behavioral Score

The behavioral score looks at actions that a user has taken in the past that may indicate that the user would be interested, or would benefit from a solar installation. Examples of factors that the behavioral score may take into account include high energy usage, unusual usage, year-over-year or month-over-month energy savings, and utility psychographic segments.

In one embodiment, a user may be scored based in part on whether the user is a high energy user. In this embodiment, the energy usage of the user over a period of time may be determined from a utility database, which may obtain energy usage information for the user from a conventional meter and/or a smart meter at the user's residence. A conventional meter may provide monthly energy usage while a smart meter may report energy usage in much smaller time intervals (e.g., of an hour or less) to the utility via a network connection (e.g., Internet). After determining the energy usage of the user, a determination may be made whether the user is a high energy user. This may be done, for example, by comparing the energy usage of the user to a threshold. If the energy usage is above the threshold, then the user may be determined to be a high energy user. In another example, the energy usage of the user may be compared to energy usage for other users (e.g., neighbors or similar users) in a group. The energy usage of the other users may be obtained from energy meters of the other users. In this example, if the user's energy usage is above the energy usage of each of a certain number or percentage of the other users, then the user may be determined to be a high energy user. A user that is determined to be a high energy user may be given more points than a user that is not determined to be a high energy user. This is because a high energy user may reduce his/her utility bills by a greater amount by installing solar panels, and may therefore have more of a financial incentive to install solar panels. In addition, the high energy user may recoup the cost of installing solar panels in a shorter period of time.

In one embodiment, a user may be scored based in part on whether the user's energy usage is unusual. As discussed above, information on the user's energy usage may be obtained from an energy meter (e.g., conventional meter and/or smart meter). In this embodiment, the user's energy usage may be examined to determine whether the energy usage is unusual. For example, if most of the energy use occurs over a relative short period of time (e.g., a month) over a long period of time (e.g., a year), then a determination may be made that the use is unusual. In this example, the home may be a vacation home that the user only occupies occasionally. If a user's energy usage is determined to be unusual, then the user may be given fewer points than a user whose energy usage is determined to be normal (e.g., consumes energy throughout the year). This is because a user may be less likely to invest in solar panels for a home he/she only occasionally uses.

In one embodiment, a user may be scored based in part on whether the user has responded to a message to reduce power consumption. For example, before a peak event (e.g., hot summer day), the user may receive a message (e.g., from the utility or third party) to reduce power consumption during the peak event. The message may be communicated to the user via text message, email, physical mail, automated phone call, etc., and the peak event may be specified by a particular time period (e.g., noon to 4 p.m. or other time period) and day designated by the utility. After the peak event, the user's energy usage (consumption) during the peak event may be examined to determine whether the user reduced his/her energy consumption in response to the message. This determination may be made by comparing the user's energy usage during the peak event with the user's energy usage during similar peak events in the past. The user's energy usage during the peak event may be obtained from a smart meter, as discussed above. In this example, a determination may be made that the user responded to the message if the user's energy usage for the most recent peak event is lower than the user's energy usage for a past peak event or the user's average energy usage for past peak events. If a determination is made that the user responded to the message (e.g., by reducing energy consumption), then the user may be given more points than a user that did not respond to a similar message. This is because a user who responds to a message to reduce power consumption may be more responsive to other messages regarding energy, such as solar energy.

In another embodiment, a user may be scored based in part on whether the user has reduced energy consumption in response to a home energy report. The home energy report may compare the energy usage (consumption) of the user to the energy usage of each one of a plurality of other users over a period of time. For example, the report may rank the user against the other users based on energy usage, in which the user is ranked higher than another user whose energy usage (consumption) is higher and ranked lower than another user whose energy usage (consumption) is lower. To make the comparison fair, the user may be compared to other users having a similar dwelling type (e.g., house, condo, apartment, etc.), similar dwelling square footage, similar heating, ventilation, and air conditioning (HVAC) system, etc. The report may be used by the utility to encourage (prompt) the user to reduce power consumption. The report may be communicated to the user via text message, email, physical mail, etc. For example, the report may be delivered to the user with the user's utility bill. In this embodiment, a determination is made whether the user has reduced energy consumption in response to the home energy report. This may be done, for example, by determining whether the user is ranked higher in a subsequent home energy report. If the user's ranking improves, then a determination may be made that the user reduced energy consumption in response to the home energy report, and the user may be given more points than a user whose ranking did not improve or improved by a smaller amount.

In one embodiment, the user may receive home energy reports on a regular basis (e.g., monthly), in which each report may rank the user against similar users based on their energy usage. In this embodiment, the user's energy usage over different periods of time may be compared to determine whether the user has reduced energy consumption in response to the home energy reports. For example, if the user's energy usage for a particular period (e.g., particularly month) in the current year is lower than the user's energy usage for the same or similar period (e.g., same month) in the previous year, then a determination may be made that the user has reduced energy consumption in response to the home energy reports. In this case, the user may be given more points than a user who did not reduce energy usage or reduced energy usage by a smaller amount in response to similar reports.

The behavioral score for a user may be computed based on the points the user is given for one or more of the factors discussed above. For example, the behavioral score may be based on an aggregate of the points given to the user for one or more of the factors.

In one embodiment, the system generates a candidate data structure that identifies buildings and/or locations that are candidates for solar installations based on the behavioral score of each building and/or location. The buildings and/or locations may be sorted by and/or stored in association with the behavioral scores. Thereafter, the system may analyze the candidate data structure and select one or more locations from the data structure and generate an electronic message for each selected location. For example, the system may select one or more locations that are above a threshold rank, or associated with behavioral scores greater than a threshold behavioral score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the behavioral scores in the candidate data structure.

Engagement Score:

The engagement score takes into account a user's engagement with a broad range of platforms and programs. Highly engaged users are more likely to engage with future programs, such as solar energy. Factors that the engagement score may take into account include past participation in energy efficiency programs, green product engagement, email engagement, web engagement, and/or mobile application download.

In one embodiment, a user may be scored based in part on whether the user participated in an energy efficiency program (e.g., a demand response program). One example of an energy efficiency program is a home energy audit. A home energy audit may be conducted by an energy specialist that inspects the user's home for power efficiency and makes recommendations for improving the power efficiency of the home based on the inspection. Alternatively or in addition, the home energy audit may be a virtual home energy audit (conducted online), in which the user answers a series of questions related to the power efficiency of the home, and is provided with recommendations for improving the power efficiency of the home based on the answers. In this embodiment, a user that participated in an energy efficiency program may be given more points than a user that did not participate in an energy efficiency program. This is because participation in an energy efficiency program may be an indication that the user is interested in reducing utility bills and/or conserving power, and therefore may be more receptive to solar energy.

In this embodiment, information on whether a user participated in an energy efficiency program may be provided, for example, by a utility sponsoring the program. For example, if a user participates in an online home energy audit provided by the utility, then the utility may maintain a record of the user's participation in the home energy audit.

In one embodiment, a user may be scored based in part on whether the user has purchased green products. Examples of green products may include a hybrid or electric vehicle, a smart thermostat, a compact fluorescent light (CFL) bulb, a light emitting diode (LED) bulb, an Energy Star certified application, etc. In this embodiment, a user that has purchased one or more green products may be given more points than a user that has not purchased a green product or purchased fewer green products. This is because purchase of a green product may be an indication that the user is interested in reducing utility bills and/or conserving power, and therefore may be more receptive to solar energy.

In this embodiment, a determination of whether a user purchased a green product may be based on whether the user applied for a rebate and/or a coupon for the green product (e.g., through the utility), whether the user applied for a clean energy tax credit for the green product (e.g., from a governmental agency), etc. In this example, a record of the user's application for a rebate, coupon and/or clean energy tax credit may be retrieved from a database (e.g., maintained by the utility).

In one embodiment, a user may be scored based in part on email engagement. For example, the user may receive an email (e.g., from the utility), in which the email may include a utility bill, energy usage information, tips for conserving energy, etc. The email may also include a link to the user's online utility account, a link to the utility's website, a link to information about a green product, etc. In this embodiment, a record may be made indicating whether a user opened the email, and, if so, whether the user clicked on a link in the email. A user that opened an email may be given more points than a user that did not open an email. For users that opened emails, a user that clicked on a link in an email may be given more points than a user that did not click on a link. This is because a click on the link may be indicative of a user that is interested in learning more about reducing utility bills and/or conserving power, and may therefore be more receptive to solar energy.

In one example, a record may be made of how often a user opened an energy-related email and/or clicked on a link in an energy-related email (e.g., number of times the user has opened an energy-related email and/or clicked on a link in an energy-related email over a period of time (e.g., one month)). In this example, a user that has opened more energy-related emails and/or clicked on more links during the period of time may be given more points than a user that opened fewer energy-related emails and/or clicked on fewer links during the period of time.

In one embodiment, a user may be scored based in part on web engagement. For example, when the user visits a website (e.g., utility's website or a third party's website), a record may be made regarding the amount of activity on the website by the user. The amount of activity may be based on, for example, how long the user has spent on the website, how often the user has visited the website, how often the user has logged onto a user account on the website, how many web pages (e.g., web pages with power-saving tips and/or web pages with information on green products) the user has viewed, how many links to other websites (e.g., websites of green product suppliers) the user has clicked on, etc. In this embodiment, a user having a greater amount of activity on the website may be given more points than a user with a lower amount or no activity on the website.

In one embodiment, a user may be scored based in part on whether the user downloaded an energy-related mobile application onto a mobile device (e.g., smart phone). Examples of energy-related mobile applications may include an application for monitoring home energy usage from a mobile device, an application for programming a smart thermostat and/or appliance from a mobile device, etc. In this embodiment, a user that has downloaded an energy-related mobile application may be given more points than a user that has not downloaded an energy-related mobile application.

The engagement score for a user may be computed based on the points the user is given for one or more of the factors discussed above. For example, the engagement score may be based on an aggregate of the points given to the user for one or more of the factors.

In one embodiment, the system generates a candidate data structure that identifies buildings and/or locations that are candidates for solar installations based on the engagement score of each building and/or location. The buildings and/or locations may be sorted by and/or stored in association with the engagement scores. Thereafter, the system may analyze the candidate data structure and select one or more locations from the data structure and generate an electronic message for each selected location. For example, the system may select one or more locations that are above a threshold rank, or associated with engagement scores greater than a threshold engagement score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the engagement scores in the candidate data structure.

Household Value Score

The household value score takes into account many factors that help to determine the potential value of a particular home from a solar generation perspective. Factors that the household value score may take into account include ownership status (owned, rented), roof direction, roof angle, roof area, shading, insolation, homeowner association (HOA) restrictions, and/or home energy audit results. Other factors that the household value may take into account include whether the home has a smart meter, a pool, and/or a smart thermostat.

In one embodiment, the ownership status of the home may be determined. If a user residing in a home is not the owner of the home (e.g., a renter), then the user may be given fewer points compared with a home owner. This is because a user who is not the home owner may have less authority to install solar panels at the home, and therefore may be a less attractive target for solar-installation marketing. In this example, a determination of whether a resident of a home is the home owner may be determined, for example, by comparing the home owner listed in a publically available deed of the home to the resident of the home. If the resident of the home is not the home owner, then marketing efforts for installing solar panels at the home may be directed to the home owner instead of the resident.

The roof direction, roof angle, roof area, shading, insolation and/or location of the home may be used to calculate the amount of energy (e.g., kWh/day) that could potentially be generated from solar panels at the home. In this embodiment, a home with a higher computed energy may be given more points than a home with a lower computed energy.

The location of the home may be used in computing the potential energy of a solar installation for the home because the optimal roof direction (orientation) and/or optimal roof angle for collecting radiation at the home may depend on the location of the home. For example, for a home located in the northern hemisphere (United States market), a roof facing due south may be more optimal than a roof facing due north. By contrast, for a home located in the southern hemisphere, a roof facing due north may be more optimal than a roof facing due south. In another example, for a home located at a higher latitude on the Earth, a larger (steeper) roof angle may be more optimal since the sun tends to be lower in the sky at higher latitudes.

The location of the home may also affect the solar isolation (e.g., amount of radiation received per unit area) at the home. The isolation for the home may be determined based on the location of the home, and a radiation map indicating isolation for different regions on the Earth. For example, the isolation may be higher for a home located in the Southwestern United States than a home located in the Northeastern United States.

In this embodiment, the location of the home may be determined, for example, from an address of the home, coordinates of the home, etc. The roof direction, roof angle and/or roof area of the home may be determined from a roof plan for the home (e.g., from a publically available database). In another example, the roof direction, roof angle and/or roof area of the home may be estimated by analyzing a satellite image, an aerial image and/or a street-view image of the home (e.g., from a publically available database) using known image processing techniques (e.g., edge detection, classification, etc.). It is to be appreciated that both techniques may be used to determine the roof direction, roof angle and/or roof area of the home.

In one embodiment, a home may be scored based in part on HOA restrictions on solar panel installation. For example, a home that is subject to stricter HOA restrictions on solar panel installation may be given a fewer points than a home that is subject more lenient or no HOA restrictions on solar panel installation. For instance, a home subject to an HOA that requires that solar panels be out of view from the front of the home may be given fewer points than a home that is not subject to such a restriction. It is to be appreciated that embodiments of the present disclosure are not limited to HOA restrictions, and that other restrictions may also be considered including state and/or local government restrictions on solar panel installation. In this embodiment, the restrictions that apply to the home may be determined using the location (e.g., address) of the home and a database of HOA, state and/or local government restrictions that apply to different geographical areas (e.g., states, cities, zip codes, neighborhoods, etc.).

In one embodiment, a home may be scored based in part on the results of a home energy audit conducted for the home. In this embodiment, a home that scores higher on power efficiency from a home energy audit may be given more points than a home that scores lower on power efficiency. This is because, for a home that is already power efficient, there may be less room for making improvements in the power efficiency of the home to reduce utility bills. In this case, solar panel installation may be the only viable option to substantially reduce utility bills. By contrast, for a home that scores lower on power efficiency, there may be a large room for making improvements in power efficiency using lower cost options (e.g., resealing windows).

In one embodiment, a home may be scored based in part on whether the home includes a smart meter and/or a smart thermostat. In this embodiment, a home with a smart meter and/or smart thermostat may be given more points compared with a home without a smart meter or smart thermostat. This is because a smart meter and/or smart thermostat may be an indication that the home owner is willing to invest capital to conserve energy, and therefore may be more likely to invest in solar panels.

The household value score for a home may be computed based on the points the home is given for one or more of the factors discussed above. For example, the household value score may be based on an aggregate of the points given to the home for one or more of the factors.

In one embodiment, the system generates a candidate data structure that identifies buildings and/or locations that are candidates for solar installations based on the household value score of each building and/or location. The buildings and/or locations may be sorted by and/or stored in association with the household value scores. Thereafter, the system may analyze the candidate data structure and select one or more locations from the data structure and generate an electronic message for each selected location. For example, the system may select one or more locations that are above a threshold rank, or associated with household value scores greater than a threshold household value score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the household value scores in the candidate data structure.

The home value score may be associated with a user (consumer) residing at the home, and may therefore be combined with the grid score, the behavioral score and/or the engagement score for the user discussed above to determine an overall lead score for the user. Similarly, the grid score, behavioral score and/or engagement score for a user may be associated with the home in which the user resides. In this example, the household value score for a home may be combined with the grid score, the behavioral score and/or the engagement score discussed above to determine an overall lead score for the home.

In one embodiment, the grid score, the behavioral score, the engagement score and/or the household value score for a user or home may be combined to determine an overall lead score for the user or home. For example, the lead scored may be computed based on a sum of the grid score, the behavioral score, the engagement score and/or the household value score. In another example, the lead scored may be computed based on a weighted sum of the grid score, the behavioral score, the engagement score and/or the household value score. In this example, each score may be weighted based on a desired contribution (influence) of the score on the overall lead score.

In one embodiment, the system generates a candidate data structure that identifies buildings and/or locations that are candidates for solar installations based on the overall lead score of each building and/or location. The buildings and/or locations may be sorted by and/or stored in association with the overall lead scores. Thereafter, the system may analyze the candidate data structure and select one or more locations from the data structure and generate an electronic message for each selected location. For example, the system may select one or more locations that are above a threshold rank, or associated with overall lead scores greater than a threshold overall lead score. In one embodiment, the electronic message includes information about solar installations. The electronic messages are then transmitted by the system via network communications to remote devices associated with the locations identified in the candidate data structure (e.g., transmitted to a remote computer, a smart meter, or other electronic device that is installed in the location using a device address/identifier). In one embodiment, the electronic message with the solar information is caused to be displayed on the remote device of the location to encourage a home owner to install solar panels. In one embodiment, the candidate data structure is used by the present system to control the transmission of electronic messages by deciding where to send the electronic messages based on the overall lead scores in the candidate data structure.

The lead score for a user (e.g., utility customer) or home may be used in conjunction one or more additional factors to help determine an ideal time to engage the respective lead and the right messaging to provide to the respective lead. Examples of these factors are given below.

Engagement Moments

The engagement moments are events and/or behaviors that generate increased likelihood of engagement with solar marketing. These moments may be monitored and solar marketing to customers may be triggered while these moments are still fresh in their minds. For example, solar marketing may be triggered for a lead (customer) if the lead has recently (e.g., within the past day, two days or three days) done one or more of the following: opened an email (e.g., email from the utility), received and/or paid a bill utility (e.g., especially a high utility bill), experienced a power outage, contacted a customer service center for the utility, logged onto his/her utility account, visited the utility's website, etc. In this example, a high utility bill may be a utility bill that is a certain percentage (e.g., 20% or more) or amount above the user's average utility bill over a period of time.

Segmentation Score

Customers may belong to different customer segments. A customer's segment may be determined based upon available information and specific messaging may be targeted based upon the unique motivations of that segment. The customer segments may include cost-conscience customers motivated by the potential cost savings of solar (~80% of solar customers), environmentally-conscience customers motivated by the fact that solar is clean energy, anti-establishment customers motivated by being "off-the-grid," superficial status-obsessed customers motivated by the publically visible status symbol of solar panels, and gadget-obsessed customers motivated by owning another cool, new, high-tech gadget.

For example, a customer may be identified as an environmentally-conscience customer if one or more of the following applies: customer has participated in a green program, customer has purchased a green product, customer lives in an area (e.g., city, zip code) in which voters passed an environmental initiative, customer lives in an area (e.g., Berkeley, Calif.) known for being environmentally minded, customer has visited a webpage discussing the environment, and/or customer has clicked on a link to information related to the environment. In this example, a marketing message directed to an environmentally-conscience customer may focus on the environmental benefits of solar energy (e.g., solar energy is clean, reduces dependency on fossil-fuel burning power plants, reduces greenhouse gas emissions, etc.).

In another example, a customer may be identified as a cost-conscience customer if one or more of the following applies: customer has participated in a home energy audit, customer reduces energy consumption in response to home energy reports, customer spends a relatively long period viewing his/her energy usage on his/her utility account, etc. In this example, a marketing message directed to a cost-conscience customer may focus on the cost benefits of solar energy (e.g., projected reduction in utility bills by switching to solar energy).

Thus, once a solar lead is identified, the content of solar marketing directed to the lead may be tailored depending on the customer segment to which the lead belongs.

Automatically Adjusting Energy Usage

In one embodiment, one or more scores calculated disclosed herein may be used to automatically adjust the energy usage of a home of a targeted customer identified based on at least the scores as described previously. For example, an energy controlling device coupled to a smart meter, a smart thermostat and/or one or more energy-consuming components installed at the home of the targeted customer may receive the scores or calculate the one or more scores. The energy controlling device may comprise hardware, such as a processor, memory, and/or a communication interface usable to transmit and/or receive signals. The energy-consuming components may include computing devices, lights, televisions, power outlets, heating devices, cooling devices, fans, etc. Based upon the one or more scores, the energy controlling device may determine a target energy usage, and/or may determine one or more corrective energy actions that, if implemented, are predicted to result in the energy usage of the home reaching the target energy usage. The energy controlling device may generate electronic instructions based upon the corrective energy actions, and may transmit the electronic instructions (e.g., via a physical connection, a network connection and/or a wireless connection) to the one or more energy-consuming components of the home and/or the smart thermostat of the home based on a network address/ID of the component or device. The electronic instructions may cause or be used by the one or more energy-consuming components and/or the smart thermostat to adjust (e.g., reduce, increase, etc.) one or more energy settings of the component/device, which in turn causes an adjustment to the energy usage of the home.

For example, where a combination of one or more of the grid score, the behavioral score, the engagement score, and/or the household value score is determined to exceed a threshold overall lead score, first electronic instructions corresponding to corrective energy actions that involve reducing energy usage may be generated by the energy controlling device and transmitted to the one or more energy-consuming components and/or the smart thermostat of the home. One or more settings of the one or more energy-consuming components and/or the smart thermostat may be adjusted based upon the first electronic instructions, which may result in energy usage of the home decreasing from a current level of energy usage to a lower level of energy usage.

It may be appreciated that after implementation of the first electronic instructions, if a determination is made that energy usage of the home falls to an excessively low level that is more than a threshold amount below the lower level, corrective electronic instructions may be generated by the energy controlling device and/or transmitted to the one or more energy-consuming components and/or the smart thermostat of the home. One or more settings of the one or more energy-consuming components and/or the smart thermostat may be adjusted based upon the corrective electronic instructions, which may result in energy usage of the home increasing from the excessively low level of energy usage to the lower level of energy usage.

In another example, where a combination of one or more of the grid score, the behavioral score, the engagement score, and/or the household value score is determined to fall short of the threshold overall lead score, second electronic instructions corresponding to corrective energy actions that involve increasing energy usage may be generated and transmitted to the one or more energy-consuming components and/or the smart thermostat of the home. One or more settings of the one or more energy-consuming components and/or the smart thermostat may be adjusted based upon the second electronic instructions, which may result in energy usage of the home increasing from a current level of energy usage to a higher level of energy usage.

It may be appreciated that after implementation of the second electronic instructions, if a determination is made that energy usage of the home increases to an excessively high level that is more than a threshold amount above the higher level, corrective electronic instructions may be generated by the energy controlling device and/or transmitted to the one or more energy-consuming components and/or the smart thermostat of the home. One or more settings of the one or more energy-consuming components and/or the smart thermostat may be adjusted based upon the corrective electronic instructions, which may result in energy usage of the home decreasing from the excessively high level of energy usage to the higher level of energy usage.

In some embodiments, the energy controlling device may be used to modify energy usage of the home in combination with one or more actions taken to engage the solar lead. In other embodiments, the energy controlling device may be used to modify energy usage of the home in preparation for and/or in place of one or more actions that could otherwise be taken to engage the solar lead. For example, resources and/or electronic messages may be transmitted to one or more components/devices at the home of the solar lead and/or associated with the solar lead (e.g., sent to an email address of the home owner) after the energy usage has been appropriately adjusted. Alternatively, resources and/or messages may be transmitted to one or more components/devices at the home of the solar lead concurrently with the adjustment of the energy usage.

In some examples, the energy controlling device may select one or more components from amongst the one or more energy-consuming components and the smart thermostat to which to send the electronic instructions (e.g., while excluding one or more other components). The selection may be based upon usage of the respective components and/or ability to use a different/adjusted amount of energy. For example, a light may be able to be dimmed and thus use less energy, and a computing device may be able to switch from a normal mode to a low-power mode and thus use less energy, but a microwave may not be able to (e.g., safely) use a different amount of energy.

The components that are sent electronic instructions may each be provided with a common instruction to reduce energy consumption (e.g., by a common percentage). Alternatively and/or additionally, various components may be sent different/custom electronic instructions (e.g., based upon their respective capabilities, usage, etc.). For example, a first component may be sent an instruction to reduce energy consumption by 10%, while a second component may be sent an instruction to reduce energy consumption by 20%.

FIG. 1 illustrates an electronic system 100 with which features of the subject technology may be implemented. Electronic system 100 may include a bus 108, processing unit(s) 112, a system memory 104, a read-only memory (ROM) 110, a permanent storage device 102, an input device interface 114, an output device interface 106, and a network interface 116.

Bus 108 collectively represents all system, peripheral, and chipset buses that communicatively connect the numerous internal devices of electronic system 100. For instance, bus 108 communicatively connects processing unit(s) 112 with ROM 110, system memory 104, and permanent storage device 102.

From these various memory units, processing unit(s) 112 may retrieve instructions (e.g., code) to execute and data to process in order to execute processes of the subject disclosure. For example, processing unit(s) 112 may retrieve instructions for determining a grid score, a behavioral score, an engagement score, and/or a household value score, and execute the instructions to generate the grid score, the behavioral score, the engagement score, and/or the household value score. Processing unit(s) 112 may also retrieve data used to determine the scores (e.g., energy usage data). Processing unit(s) can be a single processor or a multi-core processor in different implementations.

ROM 110 stores static data and instructions that are needed by processing unit(s) 112 and other modules of the electronic system. Permanent storage device 102, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 102. Other implementations use a removable storage device (such as a floppy disk, flash drive, and its corresponding disk drive) as permanent storage device 102. Like permanent storage device 102, system memory 104 is a read-and-write memory device. However, unlike storage device 102, system memory 104 is a volatile read-and-write memory, such a random access memory. System memory 104 stores some of the instructions and data that the processor needs at runtime. From these various memory units, processing unit(s) 112 may retrieve instructions to execute and data to process in order to execute the processes of some implementations.

Bus 108 also connects to input and output device interfaces 114 and 106. Input device interface 114 enables a user to communicate information and select commands to the electronic system. Input devices used with input device interface 114 include, for example, alphanumeric keyboards and pointing devices (also called "cursor control devices"). Output device interfaces 106 enables, for example, the display of images generated by the electronic system 100. Output devices used with output device interface 106 may include, for example, printers and display devices, such as cathode ray tubes (CRT) or liquid crystal displays (LCD). For example, the output devices may be used to display a solar lead score, and contact information for the respective lead (e.g., customer).

Finally, as shown in FIG. 1, bus 108 also couples electronic system 100 to a network (not shown) through a network interface 116. In this manner, the electronic system 100 can be a part of a network of computers (such as a local area network ("LAN"), a wide area network ("WAN"), or an Intranet, or a network of networks, such as the Internet. Any or all components of electronic system 100 can be used in conjunction with the subject disclosure. For example, the network interface 116 may retrieve data (e.g., from a network) used for determining the grid score, the behavioral score, the engagement score, and/or the household value score. For example, the network interface 116 may be used to retrieve energy usage for a user (e.g., utility customer) and/or grid information from a utility database, retrieve property information (e.g., home owner status, roof plan, etc.) from a municipal database, etc. The data is retrieved by accessing one or more of the databases and retrieving data records that correspond to different utility customers. The data may be stored in the storage device 102 and/or system memory 104 for processing by processing units(s) 112. Processing unit(s) 112 may process the data according to instructions for determining the grid score, the behavioral score, the engagement score, and/or the household value score discussed above.

Figure 2:
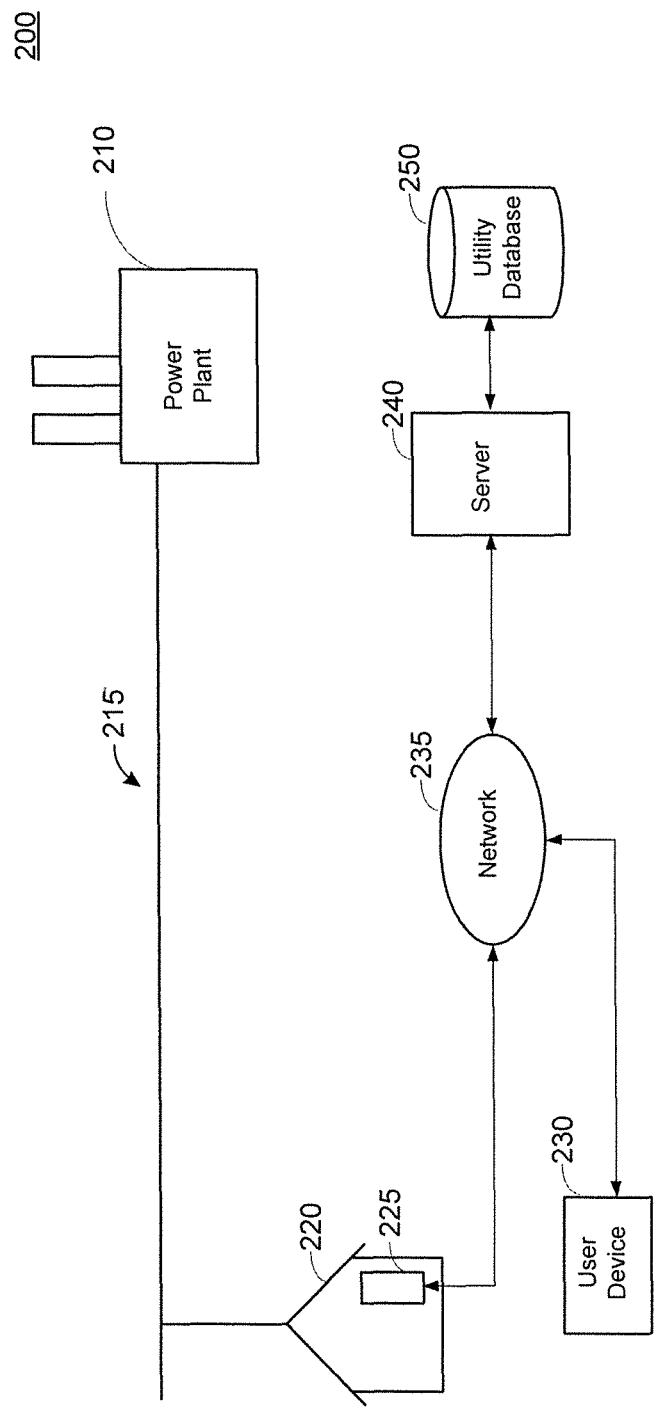
FIG. 2 illustrates an example of an environment in which various aspects of the subject technology may be practiced.

FIG. 2 illustrates an example of an environment 200 in which various aspects of the subject technology may be practiced. The environment 200 may include a power plant 210, and a grid 215 for delivering power to users (e.g., utility customers) distributed over a geographical area. For ease of illustration, one residential home 220 is shown in FIG. 2. However, it is to be appreciated that the grid 215 may provide power to many residential homes, commercial buildings, and/or industrial buildings. The home 220 may include a smart meter 225 configured to monitor the energy usage of the home and send corresponding energy usage data to a server 240 via a network 235 (e.g., Internet, cellular network, etc.). For example, the smart meter 225 may report the energy usage in time intervals of an hour or less. Upon receiving the energy usage data, the server 240 may process the data and store the processed energy usage data in a utility database 250, in which the stored energy usage data (stored in data records) may be associated with a utility account of a user residing at the home. It is to be appreciated that the server 240 shown in FIG. 2 may represent a single server or a plurality of servers that perform the various functions described herein.

The electronic system 100 shown in FIG. 1 may retrieve energy usage data for the user from the utility database 250 via the network 235. As discussed above, the system 100 may use this data to determine a solar lead score. The system 100 may similarly determine solar lead scores for a plurality of users.

In one embodiment, the system 100 generates a candidate data structure that identifies locations, including the location associated with the user, that are candidates for solar installations based on the scores, which may be sorted by and/or stored in association with the scores. The candidate data structure may be stored in the database 250. Thereafter, the system 100 may analyze the candidate data structure and select one or more locations from the data structure and generate an electronic message for each selected location. For example, the system 100 may select one or more locations that are above a threshold rank, or associated with scores greater than a threshold score. In one embodiment, the electronic message includes information about solar installations.

In some aspects, the smart meter 225 may be capable of displaying messages to the user. In these aspects, the server 240 may transmit messages, such as the electronic message, to the smart meter 225 via the network 235 for display to the user. For example, the server 240 may generate and transmit a message via the network 235 to the smart meter 225 and/or to an email address of the user for display to the user where the message indicates to reduce power consumption during a peak event. In this example, the server 240 may record the message in the database 250. The system 100 shown in FIG. 1 may retrieve this information from the database 250, and use this information in conjunction with the user's energy usage information to determine the user's energy usage during the peak event.

The server 240 may also communicate with a user device 230 via the network 235. The user device 230 may include a mobile device, computer, laptop, and/or tablet of the user. In this example, the server 240 may communicate information, such as the electronic message, (e.g., home energy reports) to the user device 230 via the network 235 in the form of a text message, an email, a webpage, etc. In this example, the server 240 may record the communications (e.g., home energy reports) in the database 250. The system 100 shown in FIG. 1 may retrieve this information from the database 250, and use this information in conjunction with the user's energy usage information to determine, for example, whether the user reduced energy consumption in response to the communications (e.g., home energy reports).

The server 240 may also host a website of the utility that the user may access via the user device 230. In this example, the server 240 may monitor the user's activity on the website and record the user's web activity in the database 250. The system 100 shown in FIG. 1 may retrieve this information from the database 250, for example, to determine the user's web engagement, as discussed above.

Figure 3:
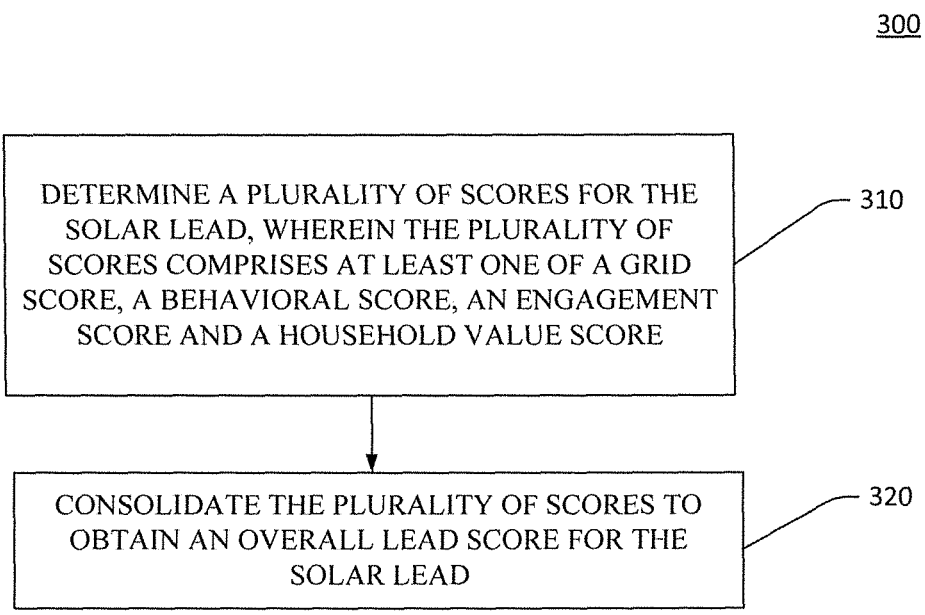
FIG. 3 is a flowchart illustrating a method for qualifying a solar lead according to an embodiment of the present disclosure.

FIG. 3 is a flowchart illustrating a computer-implemented method 300 for qualifying a solar lead according to an embodiment of the present disclosure. The method 300 may be performed, for example, by the system 100 shown in FIG. 1.

In block 310, a plurality of scores for the solar lead are determined, wherein the plurality of scores comprises at least one of a grid score, a behavioral score, an engagement score, or a household value score. For example, the grid score, the behavioral score, the engagement score, and the household value score may be determined using any of the factors discussed above. It is to be appreciated that the lead score may be determined using a subset of the grid score, behavioral score, engagement score, and household value score.

In block 320, the plurality of scores are consolidated to obtain an overall lead score for the solar lead. For example, the scores may be consolidated by computing a weighted or non-weighted sum of the scores.

After the lead score is determined, a determination may be made whether the solar lead is a high-quality solar lead based on the overall lead score. For example, the solar lead may be determined to be a high-quality solar lead if the lead score is above a threshold. In another example, the solar lead may be determined to be a high-quality solar lead if the lead score is above the lead scores of a certain number or percentage of other leads, in which the lead score of each of the other leads may be computed in a similar manner. If the solar lead is a high-quality solar lead, then solar marketing resources may be directed to the lead.

In another embodiment of method 300, the method 300 is implemented by a computing system comprising at least one processor and a memory device including stored executable instructions that, when executed by the at least one processor, cause the at least one processor to perform at least an algorithm of the method 300. For example, the algorithm determines a geographical area associated with a strain on a power grid as previously described. A plurality of buildings are identified at locations within or near the geographical area that use energy from the power grid as previously described (e.g., by analyzing data records from a utility database). For each of the buildings, a plurality of scores are determined, where the plurality of scores for each building comprises: (a) a grid score and (b) a behavioral score. For example, the grid score is determined based upon: i) determining a location of the building, and ii) comparing the location of the building with the geographical area associated with the strain to determine whether the location of the building is within the geographical area associated with the strain. Locations that are within the geographical area of the strain will receive higher scores (e.g., better candidate score) than locations outside the geographical area. Other examples were previously described.

In one embodiment, the behavioral score is determined based in part on whether energy usage was reduced at the location of the building in response to a request to reduce energy, as described previously. This may be determined from previously collected data from the location. The algorithm performed by the system then combines the plurality of scores to determine an overall lead score for the building. The system generates a candidate data structure that identifies at least the locations of the buildings and their corresponding overall leads scores. The candidate data structure may be a data table with one or more data fields for each location such as location address, owner name, overall lead score, email contact address, smart meter network address, and/or other data fields. The candidate data structure may be a database with data records that store similar data for each location as above.

The algorithm further includes analyzing the candidate data structure and the data fields to identify and/or select one or more locations based in part on the overall lead score. For example, the locations with the highest overall lead scores (e.g., as compared to a threshold and/or the other lead scores) are determined as the most likely candidate locations that will be interested in installing solar products. In one embodiment, the locations may be sorted by overall lead score. An electronic message is generated for the selected one or more locations, where the electronic message includes information about solar panels and/or about installing solar products to encourage them to purchase and install solar products. The system then controls, based on the overall lead scores of the selected locations, transmission of the electronic messages via network communications to remote devices associated with the one or more selected locations. In this way, the candidate data structure and the overall lead scores control what messages are generated and where to transmit the messages (transmit to selected locations). The messages may be electronically sent to email addresses or other device IDs that are associated with the selected location and/or the owner of the location. In another embodiment, the method further includes automatically adjusting settings of a remote device at the one or more selected locations to cause an adjustment of energy usage at the locations based upon the overall lead score. For example, the adjustment includes transmitting electronic instructions to a device installed at the location that can be controlled remotely and changing settings of the device (e.g., change temperature settings at a thermostat in a house).

Various aspects of the subject technology described above relate to solar leads. However, other aspects of subject technology and certain aspects described above may also relate to other distributed energy sources (e.g., wind power, water power, chemical power sources, energy storage capabilities, etc.). A user with another energy generation or storage installation may be able to connect their installation to the grid to supply excess electrical power (either stored or generated by their installation) to the grid for use by other users on the grid. Thus, additional capacity may be provided to the grid. The various scores discussed above may be utilized to identify high-quality leads for other distributed energy sources, thus reducing the customer acquisition costs for installations.

The functions described above can be implemented in digital electronic circuitry, in computer software, firmware or hardware. The techniques can be implemented using one or more computer program products. Programmable processors and computers can be included in or packaged as mobile devices. The processes can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined headings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method for qualifying a solar lead, comprising:
   determining, using a processor, a plurality of scores for the solar lead, wherein the plurality of scores comprises at least two of:
   i) a grid score,
   ii) a behavioral score,
   iii) an engagement score, and
   iv) a household value score determined based upon:
      i) determining a location of the solar lead,
      ii) determining a geographical area associated with restrictions on solar panel installation, and
      iii) comparing the location of the solar lead with the geographical area associated with the restrictions to determine whether the location of the solar lead is within the geographical area associated with the restrictions;
   combining the plurality of scores to determine an overall lead score for the location; and
   if the overall lead score is above a threshold, causing an output device to print an output including at least solar installation information data for transmission to the solar lead to cause adjustment of energy usage at the location of the solar lead.

2. The computer-implemented method of claim 1, wherein adjustment of the energy usage further comprises:
   generating an electronic message for the location; and
   transmitting the electronic message to a remote device associated with the location wherein the electronic message includes at least the solar installation information data.

3. The computer-implemented method of claim 1, wherein determining the grid score comprises determining whether the location consumes more than a threshold amount of energy during peak hours based on energy usage information for the location.

4. The computer-implemented method of claim 1, wherein determining the grid score comprises determining whether neighbors of the location have already installed solar panels.

5. The computer-implemented method of claim 1, wherein determining the behavioral score comprises determining whether energy usage was reduced at the location during a peak event in response to a message to reduce energy usage during the peak event.

6. The computer-implemented method of claim 1, wherein determining the behavioral score comprises determining whether energy usage was reduced at the location in response to a report that ranks the location against a plurality of locations based on energy usage at the location and energy usage at each of the plurality of locations.

7. The computer-implemented method of claim 1, wherein determining the engagement score comprises determining whether a device associated with the location has accessed an energy-related message.

8. A non-transitory computer-readable storage medium including instructions that, when executed by a processor, cause the processor to:
   determine a plurality of scores for a location of a building, wherein the plurality of scores comprises:
   i) a behavioral score determined based upon:
      i) determining a first rank of the location in a first report, corresponding to a first period of time, that ranks the location against a plurality of utility consumers based on:
         i) energy usage at the location determined based upon energy usage information received from an energy meter of the location via a network connection, and
         ii) energy usage of each of the plurality of utility consumers,
      ii) determining a second rank of the location in a second report, corresponding to a second period of time subsequent to the first period of time, that ranks the location against the plurality of utility consumers based on:
  i) energy usage of the location determined based upon energy usage information received from the energy meter of the location via a network connection, and
  ii) energy usage of each of the plurality of utility consumers, and
  iii) comparing the first rank of the location to the second rank of the location to determine whether energy usage was reduced at the location in response to the first report, and
ii) an engagement score;
combine the plurality of scores to determine an overall lead score for the location; and
automatically adjust energy usage at the location based upon the overall lead score.

9. The non-transitory computer-readable storage medium of claim 8, wherein automatically adjusting the energy usage comprises:
generating an electronic message for the location; and
transmitting the electronic message to a remote device associated with the location.

10. The non-transitory computer-readable storage medium of claim 9, wherein the electronic message comprises instructions to change a setting of the remote device.

11. The non-transitory computer-readable storage medium of claim 8, wherein determining the engagement score comprises determining whether a device associated with the location has accessed an energy-related message.

12. The non-transitory computer-readable storage medium of claim 8, wherein determining the engagement score comprises determining whether a device associated with the location has selected a link in an energy-related message.

13. The non-transitory computer-readable storage medium of claim 8, wherein determining the engagement score comprises determining whether an order for a green product has been received from a device associated with the location.

14. The non-transitory computer-readable storage medium of claim 8, wherein determining the engagement score comprises determining whether a request for a rebate, coupon or tax credit has been received from a device associated with the location.

15. A system comprising:
at least one processor; and
a memory device including instructions that, when executed by the at least one processor, cause the at least one processor to:
  determine a geographical area associated with a strain on a power grid;
  identify a plurality of buildings at locations within or near the geographical area that use energy from the power grid;
  determine a plurality of scores for each of the plurality of buildings, wherein the plurality of scores for a building comprises:
    (a) a grid score determined based upon:
      i) determining a location of the building, and
      ii) comparing the location of the building with the geographical area associated with the strain to determine whether the location of the building is within the geographical area associated with the strain, and
    (b) a behavioral score determined based in part on whether energy usage was reduced at the location of the building in response to a request to reduce energy usage;
  combine the plurality of scores to determine an overall lead score for the building;
  generate a candidate data structure that identifies the locations of the buildings and corresponding overall lead scores;
  analyze the candidate data structure to select one or more locations based in part on the overall lead scores;
  generate an electronic message for the selected one or more locations, where the electronic message includes information about solar panels; and
  control, based on the overall lead scores, transmission of the electronic messages via network communications to remote devices associated with the one or more locations to cause adjustment of enemy usage at the corresponding location.

16. The system of claim 15, further comprising:
generating a second electronic message for the location including instructions for changing energy settings of a thermostat; and
transmitting the second electronic message to the remote device.

17. The system of claim 15, wherein determining the grid score comprises determining whether the location consumes more than a threshold amount of energy during peak hours based on energy usage information for the location.

18. The system of claim 15, wherein determining the grid score comprises determining whether neighbors of the location have already installed solar panels.

19. The system of claim 15, wherein determining the behavioral score comprises determining whether energy usage was reduced at the location in response to a report that ranks the location against a plurality of locations based on energy usage at the location and energy usage at each of the plurality of locations.

* * * * *